H. VOSBURG.
Garden Scarifiers.
No. 153,865.  Patented Aug. 4, 1874.
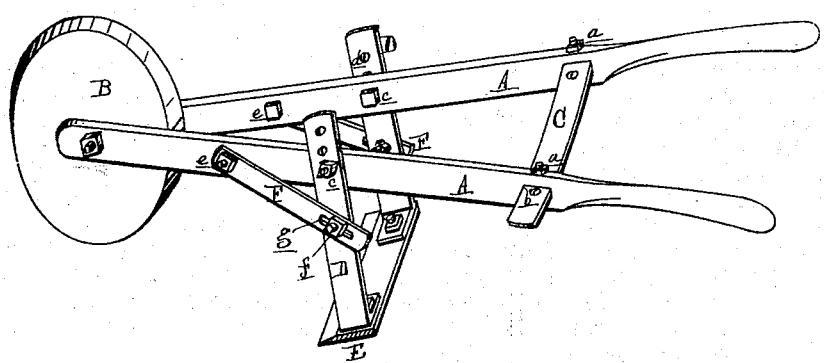

UNITED STATES PATENT OFFICE.

HARMON VOSBURG, OF UTICA, MICHIGAN.

IMPROVEMENT IN GARDEN-SCARIFIERS.

Specification forming part of Letters Patent No. 153,865, dated August 4, 1874; application filed April 14, 1874.

*To all whom it may concern:*

Be it known that I, HARMON VOSBURG, of Utica, in the county of Macomb and State of Michigan, have invented an Improvement in Adjustable Garden - Scarifiers, of which the following is a specification:

The nature of this invention relates to certain new and useful improvements in the construction of garden implements, designed to cut off weeds just below the surface of the ground, and after its passage to leave the ground level as before, and not in ridges or uneven knobs, as when the weeds are cut up with a cultivator or an ordinary hoe. It is made adjustable to cut at any desired depth, or by a change of blades to cut widths varying, as required, by varying distances between the rows, as more fully hereinafter described.

In the accompanying drawings, wherein the device is shown in perspective, A are the handles, and B the wheel, which rotates on an axle, the ends of which are suitably journaled in the ends of the handles. These latter are connected by the strap C, which passes through suitable mortises in the handles, and the bolts *a*, which pass through the handles and corresponding holes *b* in the strap. A series of these holes allow these handles to be expanded or contracted, as may be desired. The standards D are secured to the handles by means of the bolts *c* passing through said handles and the holes *d*, of which there are a series, as shown, to allow the standards to be adjusted higher or lower, as may be desired. The blade E is secured to the bottom of and at right angles with the standards. The front edge of the blade is sharpened, and the standards have a rake, so that in the forward motion of the implement the blade will be forced into and through the ground under the surface, the depth being regulated by the adjustability of the standards, as hereinbefore described. The braces F are secured to the handles by the bolts *c*, and extend rearward, where they are connected by the bolts *f* passing through the standards and the slots *g* in the braces. These latter govern the pitch of the blade by controlling the rake of the standards. Blades of varying lengths are furnished, so that the implement may be used, being adjustable as above described, between rows at varying distances apart.

What I claim as my invention, and desire to secure by Letters Patent, is—

In combination, the adjustable handles A, and pivoted adjustable standards D, with the blade E and slotted pivoted braces F, constructed and arranged substantially as described, and operating in the manner and for the purpose set forth.

HARMON VOSBURG.

Witnesses:
C. E. HUESTIS,
H. S. SPRAGUE.